United States Patent [19]

Oswald

[11] Patent Number: 5,679,993
[45] Date of Patent: Oct. 21, 1997

[54] BRAKE ASSEMBLY FOR A MOTOR

[76] Inventor: David T. Oswald, 565 Stellar Ridge La., P.O. Box 146, Sequim, Wash. 98382

[21] Appl. No.: 408,640

[22] Filed: Mar. 22, 1995

[51] Int. Cl.⁶ .......................... H02K 49/00; B60T 13/04; B60T 11/00; F16D 55/08
[52] U.S. Cl. .................. 310/93; 188/171; 188/370; 188/72.1
[58] Field of Search ..................... 188/171, 370, 188/72.1, 73.1, 156; 310/77, 93

[56] References Cited

U.S. PATENT DOCUMENTS

| | | | |
|---|---|---|---|
| 3,575,267 | 4/1971 | Laurer, Jr. | 188/195 |
| 3,665,231 | 5/1972 | Wendler | 310/77 |
| 3,665,232 | 5/1972 | Speranksy et al. | 310/77 |
| 3,771,625 | 11/1973 | Martins | 188/71.8 |
| 3,800,920 | 4/1974 | Warwick | 188/106 F |
| 4,022,301 | 5/1977 | Hansen | 188/72.1 |
| 4,042,077 | 8/1977 | McCarthy | 188/171 |
| 4,381,048 | 4/1983 | Haverkamp et al. | 188/171 |
| 4,609,080 | 9/1986 | Sekella | 188/171 |
| 4,673,064 | 6/1987 | Will | 188/18 A |
| 4,732,241 | 3/1988 | Yoshida | 188/73.34 |
| 4,734,604 | 3/1988 | Sontheimer et al. | 310/76 |
| 4,823,920 | 4/1989 | Evans | 188/73.34 |
| 4,923,055 | 5/1990 | Holland | 187/109 |
| 5,057,728 | 10/1991 | Danmeyer et al. | 310/77 |
| 5,101,939 | 4/1992 | Sheridan | 188/171 |
| 5,121,018 | 6/1992 | Oldakowski | 310/77 |
| 5,306,989 | 4/1994 | Feller, Jr. | 318/372 |

OTHER PUBLICATIONS

Marathon LeTourneau Electronic Hoist Brake brochure.
Electro Heavy Equipment brochure.
C–10 DC Motor Assembly and Parts List, Art Work No. LeT–677–88, Marathon LeTourneau, 1988.
DC Motor Assembly (with brakes) and Parts List, Art Work No. 656–3388–69, Marathon Le Tourneau Company.
2 AC Motor Assembly—Tusk and Parts lists, Art Work No. 656–3316–69.
4 AC 10F6S Large Brake and Parts List, Art Work No. LeT–625–88, Marathon LeTourneau, 1988.
3 AC Motor Assembly and Parts List, Art Work No. LeT–669–88, Marathon LeTourneau, 1988.
Installation, Maintenance and Spare Parts Instructions, 1CD "C–Stop" Range, Spring–applied, Electromagnetically–Released Caliper Brake, Matrix Engineering.

*Primary Examiner*—Steven L. Stephan
*Assistant Examiner*—Michael J. Wallace, Jr.
*Attorney, Agent, or Firm*—Seed and Berry LLP

[57] ABSTRACT

A brake assembly is provided for a motor having an endbell and a hub attached to a shaft. A mounting plate is coupled to the endbell and a spacer is adjacent to the hub. A disc is attached to the hub and is disposed adjacent to the spacer opposite from the hub. A caliper is coupled to the mounting plate and is operable to engage the disc absent a signal and to disengage the disc in response to the signal.

37 Claims, 6 Drawing Sheets

BRAKE ASSEMBLY FOR A MOTOR

TECHNICAL FIELD

The present invention relates generally to electrical and mechanical devices and more specifically to an assembly for braking a motor, a motor incorporating such an assembly, and a device incorporating such a motor.

BACKGROUND OF THE INVENTION

Today's heavy equipment or machinery may include one or more electric motors that are powered by an on-board generator and drive portions of the machine. An example of a machine that uses such electric motors is a log stacker manufactured by Marathon LeTourneau Heavy Equipment, Inc. Such log stackers and their brake systems are well known in the art. Other examples of such a machine include oil-fig equipment, fork lifts, cranes, and large drop trucks. Often, such a motor is powered with an alternating-current (AC) voltage source, and includes a brake assembly that disengages during periods when the motor is active and engages during periods when the motor is inactive. Thus, such a brake holds the motor shaft and anything coupled to it (such as a drive wheel or a lift mechanism) in a fixed position during periods of motor inactivity to prevent unwanted movement of the machine or its moveable parts.

A problem with such a brake assembly is that it can generate irritating and sometimes dangerous noise levels of up to 100 decibels (db). Such noise levels may force operators of, and those working near, machines incorporating such a brake to wear ear protection. Furthermore, because it rims on AC voltage, such a brake typically requires frequent (often weekly or daily) adjustments that are difficult and time consuming to perform. Additionally, such a brake includes a number of parts that wear and that often must be replaced on a regular basis. Because it is typically difficult to disassemble, repairing and replacing worn parts in such a brake are often difficult and time consuming. Also, the replacement parts can be expensive. Another problem with such a brake assembly is that it may transfer the heat it generates during braking. This transferred heat may reduce the life of or otherwise damage the motor.

SUMMARY OF THE INVENTION

In accordance with one aspect of the present invention, a brake assembly is provided for a motor having an endbell and a hub attached to a shaft. The brake assembly includes a mounting plate that is coupled to the endbell, and a spacer that is adjacent to the hub. A disc is attached to the hub and positioned adjacent to the spacer opposite from the hub. A first caliper is coupled to the mounting plate and is operable to engage the disc absent a signal and to disengage the disc in response to the signal. The assembly may include a second caliper to provide additional braking power.

In another aspect of the invention, the caliper includes multiple pads. A spring device is operable to compress the pads against the disc absent the signal, and an electromagnetic device is operable to retract the pads away from the disc in response to the signal.

In still another aspect of the invention, a transport device includes a number of drive wheels, a frame mounted on the drive wheels, a lift and an electrical generator mounted on the frame, and a number of electric motors each operable to drive a respective one of the wheels and the lift in response to a respective signal, and to brake the respective one of the wheels and the lift absent the respective signal. Each of the motors includes an endbell, a shaft, a mounting plate coupled to the endbell, a disc coupled to the shaft, and a first caliper coupled to the mounting plate and operable to engage the disc absent the respective signal and to disengage the disc in response to the respective signal.

Advantages provided by various aspects of the present invention include a substantial reduction in the noise level generated upon braking, the frequency and difficulty of adjustments, the number of parts that wear, the difficulty of disassembly and repair, and the transfer of braking heat to the motor. Additionally, replacements for the worn parts are often substantially less expensive than those for existing brakes.

BRIEF DESCRIPTION OF THE DRAWINGS

To more clearly illustrate and explain the inventive concept, the following drawings are provided where like numerals identify like and corresponding parts.

DETAILED DESCRIPTION OF THE INVENTION

Figure 1:
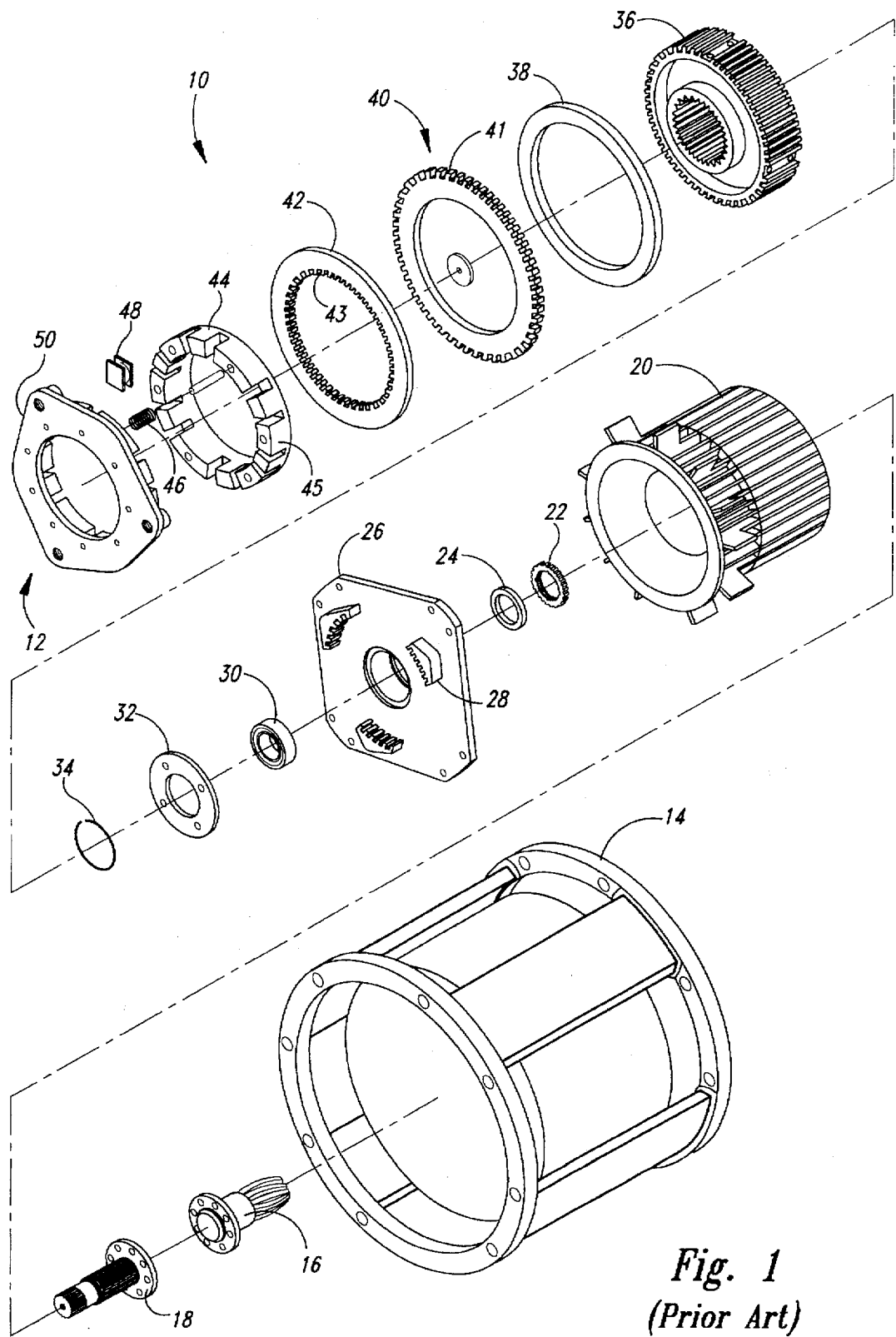
FIG. 1 is an exploded isometric view of an existing brake assembly and the motor incorporating it.

FIG. 1 is an exploded isometric view of a motor 10 that includes an existing brake assembly 12. An example of such a motor is one manufactured by Marathon LeTourneau. Motor 10 is powered by 545 volts AC (VAC) and includes a stator 14, a pinion 16, a rotor shaft 18, a rotor 20, a splined nut 22, a seal support 24, an endbell 26 having disc-retainer segments 28, a beating assembly 30, a retainer 32, and a seal 34.

Brake assembly 12 includes a brake hub 36, an optional spacer hub 38, one or more lined or stationary discs 40 having outer teeth 41, one or more rotating steel discs 42 having inner teeth 43, an inner magnetic ring 44 having laminated sections 45, multiple brake springs 46, multiple coils 48, and an outer magnetic ring 50. The use of multiple discs 40 and 42 arranged one after the other increases the braking area and thus increases the braking power of brake 12. The widths of hub 36 and segments 28 are selected to accommodate the number of discs 40 and 42 present in brake 12. Other parts of motor 10 and brake assembly 12, such as screws, washers, and electrical connection terminals, are omitted for clarity. The structures of motor 10 and brake assembly 12 are further described in parts list No. 656-3316-69 of Marathon LeTourneau, which is incorporated by reference.

In operation, when motor 10 is provided a power signal, i.e., active, shaft 18 rotates freely while brake 12 disengages discs 40 and 42 from one another. When motor 10 is inactive, i.e., not receiving a power signal, brake 12 engages discs 40 and 42 with one another to prohibit shaft 18 from rotating. Thus, such braking action during periods when motor 10 is inactive prevents the unwanted movement or activation of a structure, such as a drive wheel or a lift, that is coupled to pinion 16.

In more detail, when motor 10, and thus brake assembly 12, are active, the magnetic fields generated within hollow coils 48 attract the laminations 45, which fit and are received within the inner cavities formed by coils 48. Such attraction overcomes the opposing force of springs 46 and disengages ring 44 from compressing discs 42 against discs 40. Thus, the shaft 18 and items coupled thereto, such as discs 42, can rotate freely.

When motor 10, and thus brake 12, are inactive, springs 46 force inner ring 44 away from outer ring 50 and against an adjacent disc 40 or 42, and thus compress discs 40 against discs 42. The engagement of teeth 41 with the teeth of retainer segments 28 maintains discs 40 in stationary positions. The engagement of teeth 43 with hub 36 indirectly couples discs 42 to shaft 18. Thus, the friction between discs 40 and 42 during the compression thereof stops any existing rotation and prohibits any further rotation of discs 42, hub 36, and shaft 18. Thus, such braking action prohibits the undesired rotation of pinion 16 and devices or mechanisms attached thereto while motor 10 is inactive. When present, spacer hub 38 provides only limited protection, if any, to the stator 14, rotor 20, and other motor 10 components from the heat generated by discs 40 and 42 during braking.

One problem with braking assembly 12 is that the sections 45, which are laminated to concentrate the eddy currents generated by the magnetic fields of coils 48, may be inelastically compressed or otherwise disfigured as coils 48 repeatedly pull them into the ring 50 with great force when brake 12 transitions from an inactive to an active state. As the length of laminations 45 shortens, coils 48 must retract inner ring 44 farther before laminations 45 seat therein. Thus, such shortening increases the distance that inner ring 44 must travel during a retraction. To compensate for this increase, brake 12 is manually adjusted to position rings 44 and 50 closer together and thus to return the retraction distance to its desired value. Under normal use, such an adjustment may need to be performed frequently, such as weekly or even daily.

Also, the squealing and other noises caused by the rubbing of discs 40 against discs 42 during braking may approach 100 db, and thus require persons in the vicinity to wear hearing protection. Furthermore, the design of brake 12 makes its disassembly and the replacement of worn parts, such as ring 44 and discs 40 and 42, difficult and time consuming.

Figure 2:
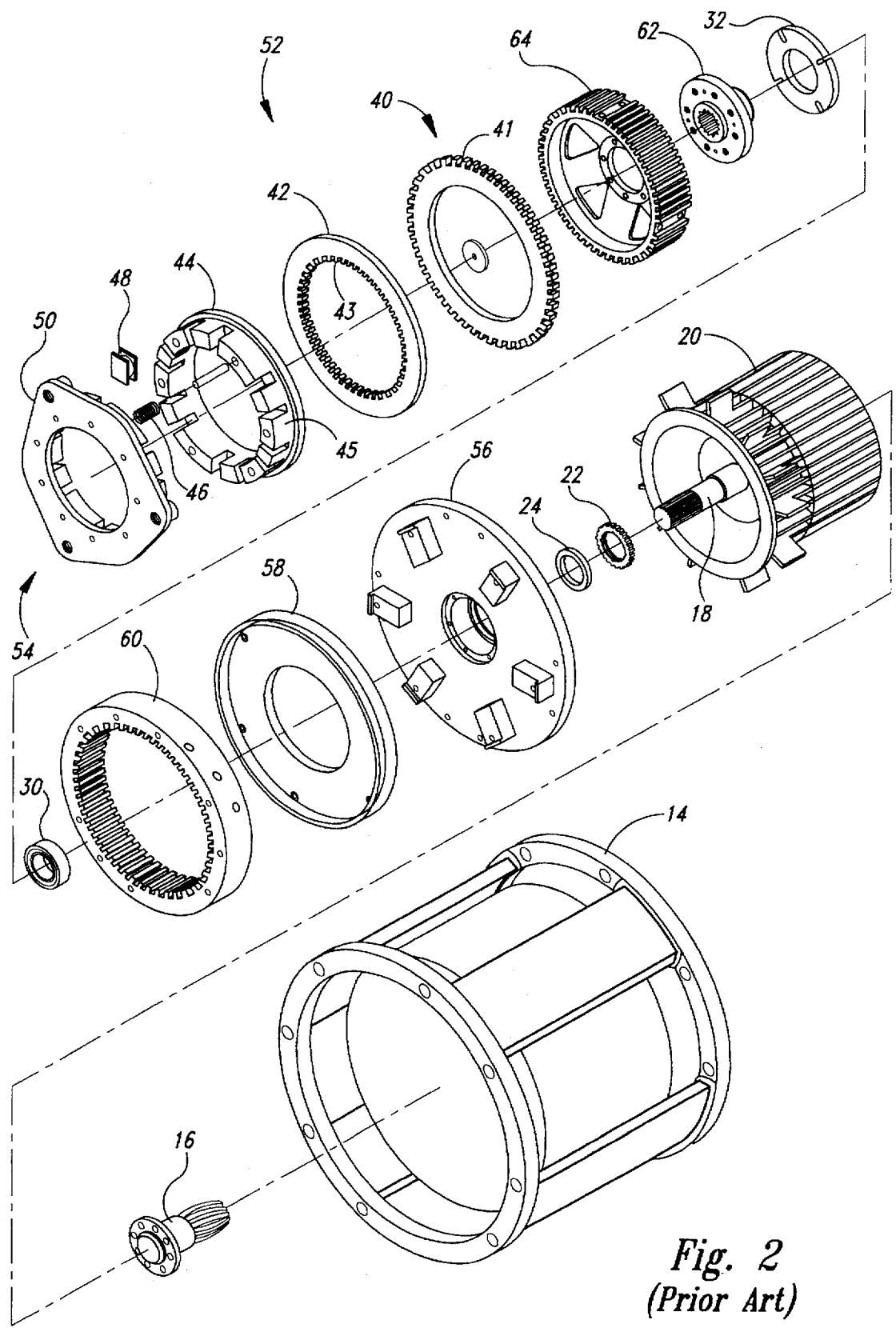
FIG. 2 is an exploded isometric view of another existing brake assembly and the motor incorporating it.

FIG. 2 is an exploded isometric view of a motor 52 that includes another existing brake assembly 54. Like motor 10, motor 52 includes a stator 14, a pinion 16, a rotor 20, a rotor shaft 18, a splined nut 22, a seal support 24, a bearing assembly 30, and a retainer 32. Motor 52 also includes an endbell 56. Like brake assembly 12, brake assembly 54 includes stationary brake discs 40, rotating brake discs 42, inner ring 44, springs 46, coils 48, and outer ring 50. Brake assembly 54 also includes support plate 58, a brake ring 60, a brake hub 62, and a ring drive 64, which is similar to the brake hub 36 of FIG. 1. As in FIG. 1, components such as bolts, washers, and electrical connection terminals are omitted from FIG. 2 for clarity. The structures of motor 52 and brake assembly 54 are further described in parts list No. Let-669-88 of Marathon LeTourneau, which is incorporated by reference.

The provision of endbell 56, plate 58, ring 60, hub 62, and drive 64 may simplify the disassembly and repair of brake assembly 54 as compared to brake assembly 12 of FIG. 1. For example, if the teeth of ring 60 become damaged, there is no need to replace endbell 56 too. Also, the dimensions of brake hub 62 remain the same as the number of discs 40 and 42 varies; only the width of ring drive 64 need change. Such provisions may also reduce the cost of repairing brake 54.

Motor 52 and brake assembly 54 operate similarly to motor 10 and brake assembly 12 as described above in conjunction with FIG. 1. Other than the above-discussed advantages, brake 54 has problems similar to those associated with brake 12 and discussed above in conjunction with FIG. 1.

Figure 3:
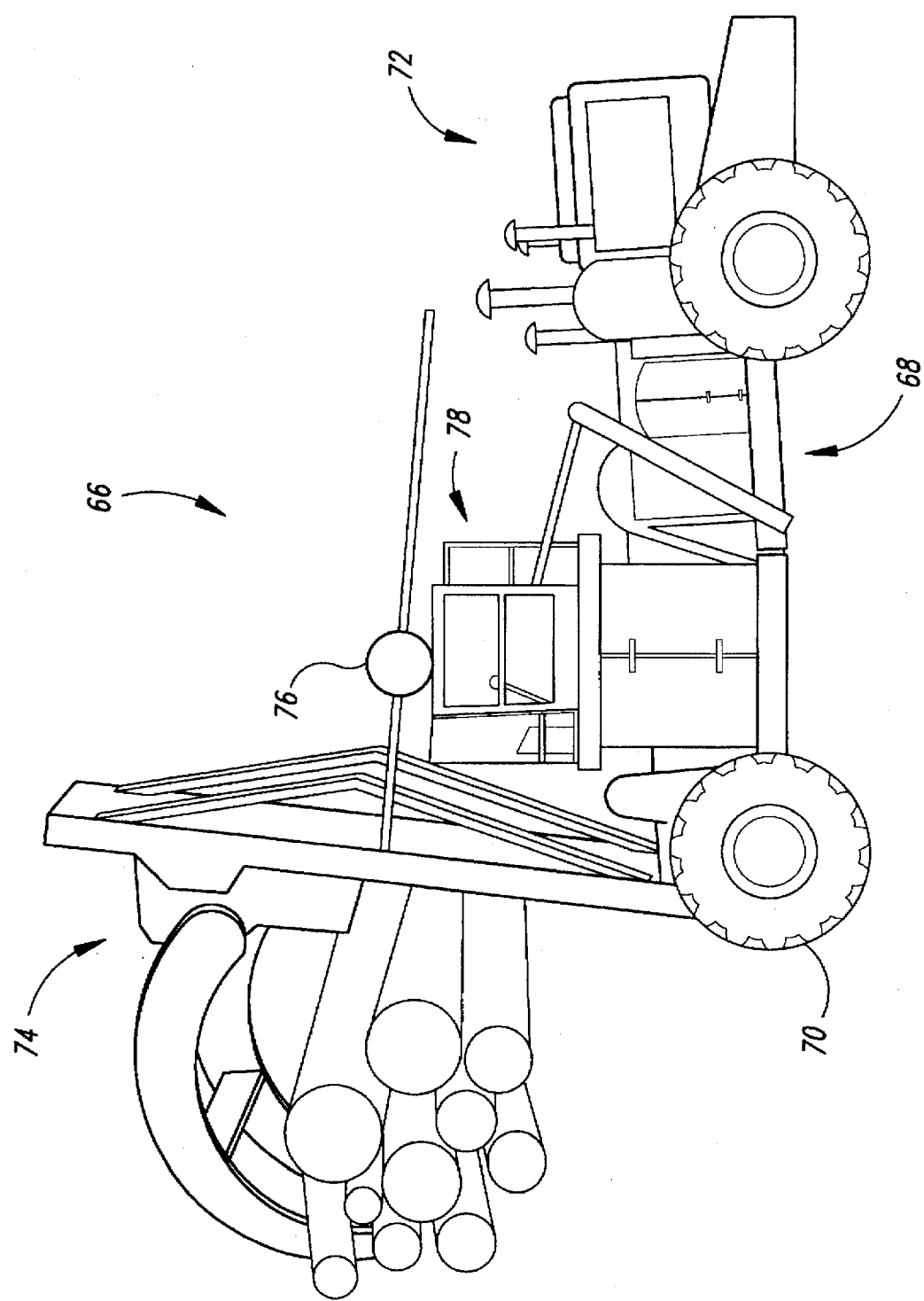
FIG. 3 is a perspective view of a log stacker that incorporates the present invention.

FIG. 3 is a perspective view of a log stacker 66 that can incorporate a motor having a brake assembly according to the present invention. One example of such a log stacker is one manufactured by Marathon LeTourneau. Log stacker 66 includes a frame 68, drive wheels 70, a fuel-powered electric generator 72, a lift mechanism 74, a tilt motor 76, and a control booth 78 for housing a control panel and an operator (both not shown). Motor 76, the motors (not shown) that power the drive wheels 70, and other motors (not shown) may include a brake assembly according to the present invention.

In operation, the operator, via the control panel, activates the drive wheels 70 to move the log stacker 66 to a desired location. Once there, the operator instructs motor 76 to position lift mechanism 74 in the desired horizontal location, and another motor (not shown) to position the lift mechanism in the desired vertical location to either load or unload a stack of logs. Like brakes 12 and 54 of motors 10 and 52 (FIGS. 4 and 6), respectively, the brakes of motor 76 and those powering drive wheels 70 and the lift mechanism 74 disengage when active to allow the motor shafts to rotate freely. When inactive, the brake assemblies stop existing and prevent further rotation of the motor shafts. Thus, the operator need not independently brake the motors. Furthermore, because the brakes require power to disengage but not to engage, if power is inadvertently disconnected from a motor, the brake will engage and thus prohibit a rotation of the motor shaft that might cause damage to the stacker 66 or its surroundings. For example, the interruption of power to any of the lift-mechanism motors will not cause the mechanism 74 to release a load of logs. Thus, engagement of the brake assembly in the absence of power is an important safety feature.

Figure 4:
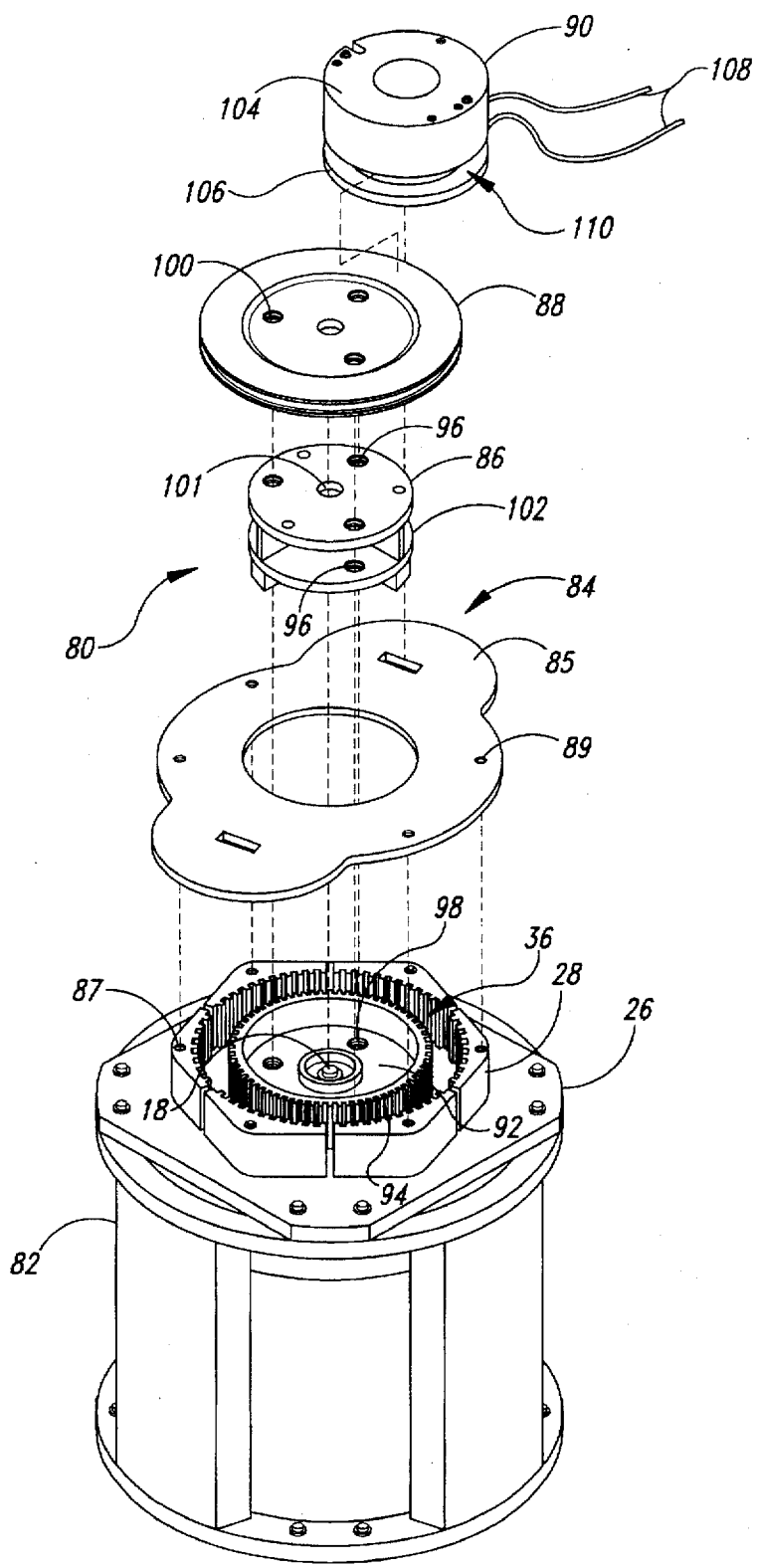
FIG. 4 is an exploded isometric view of a brake assembly according to the present invention.

FIG. 4 is an exploded isometric view of a brake assembly 80 in accordance with the present invention. Although not part of brake assembly 80, other components of a motor 82 are shown for clarity. Motor 82 may be similar to either motor 10 or 52 of FIGS. 1 and 2, respectively, or to another suitable motor. Because brake assembly 80 can easily replace brake assembly 12 of FIG. 1, motor 82 is shown resembling motor 10.

Brake assembly 80 includes a mounting plate 84, a spacer 86, a disc 88, and a spring-applied, electromagnetically released caliper 90. Other items, such as bolts, washers, and electrical connection terminals, are omitted for clarity.

As shown, mounting plate 84 includes a pair of mounting regions 85 and is attached to endbell 26. In the illustrated embodiment, plate 84 is bolted via holes 89 to threaded holes 87 in the retaining blocks 28. However, plate 84 may be coupled to endbell 26 in any suitable manner, such as with one or more weld joints. In one aspect of the invention, plate 84 is made from a ½" steel plate and has an inside diameter of approximately 9" and an outside diameter (omitting regions 85) of approximately 16⅜". Holes 89 are arranged in a circle having a diameter of approximately 14½', and are spaced approximately 7⁷⁄₁₆" from each other. In another aspect of the invention, mounting plate 84 may contain one or at least three mounting regions 85.

Spacer 86 is then inserted into the recess defined by the bottom plate 92 and outer cylindrical wall 94 of hub 36. As discussed above in conjunction with FIG. 1, the width of cylindrical wall 94, i.e., the distance it extends beyond plate 92, varies with the number of discs 40 and 42. Thus, spacer 86 is constructed to have a width sufficient to provide adequate clearance between mounting plate 84 and disc 88. Spacer 86 has three spacer holes 96, which are spaced approximately 120 degrees apart so that they can be aligned with the three threaded holes 98 in plate 92. (Holes 98 are typically provided by the manufacturer for the coupling of a wheel puller to remove hub 36 from the shaft 18.) Spacer 86 is further discussed below in conjunction with FIG. 5.

Next, disc 88, which has three holes 100 that are alignable with holes 96 and 98, is placed adjacent spacer 86 on a side opposite of hub 36. Three cap screws (not shown) are then inserted through holes 100 and 96, and are screwed into threaded holes 98 so as to secure disc 88 and spacer 86 to hub 36. Additionally, a fourth cap screw (not shown) may be inserted through the center hole 101 in spacer 88 and into shaft 18. Bottom plate 102 of spacer 86 includes a countersunk center hole (FIG. 5) that allows this fourth cap screw to secure spacer 86 to shaft 18 and thus against plate 92.

Electric caliper 90 includes an upper portion 104, a lower portion 106, electrical connection terminals 108, and a space 110 between portions 104 and 106 for receiving an outer portion of disc 88. Caliper 90 is coupled to a mounting region 85 of plate 84 with bolts (not shown) or by other suitable means. Caliper 90 is further discussed below in conjunction with FIG. 7.

In operation, when brake assembly 80 (and motor 82) is active, i.e., disengaged, disc 88 is free to spin within the space 110. When brake assembly 80 is inactive, i.e., engaged, upper portion 104 and lower portion 106 of caliper 90 are forced together to decrease the width of space 110 and compress against opposing surfaces of the outer portion of disc 88. When fully compressed, upper and lower portions 104 and 106 clamp disc 88 with a force sufficient to stop any existing, and prevent any further, rotation of disc 88. Thus, when brake 80 (and motor 82) is inactive, caliper 90 prohibits the rotation of shaft 18 via its clamping of disc 88.

The brake pads or linings 160 and 162 (FIG. 7), which line the surfaces of upper and lower portions 104 and 106 that face disc 88, generate little or no noise when they engage disc 88. Also, the reduced number of parts reduces the complexity and the difficulty of disassembling brake 80. Furthermore, pads 160 and 162 are often the only parts to exhibit any wear, and they are easy and inexpensive to replace. Moreover, a second caliper 90 (not shown) can be attached, in a fashion similar to that described above, to a second mounting region 85 of mounting plate 84 to increase the braking power of assembly 80. Additionally, disc 88 often includes fins (not shown) between the opposing surfaces of the outer portion thereof to dissipate the heat generated during braking. Thus, the structure of brake assembly 80 transfers little or no braking heat to the motor 82.

Figure 5:
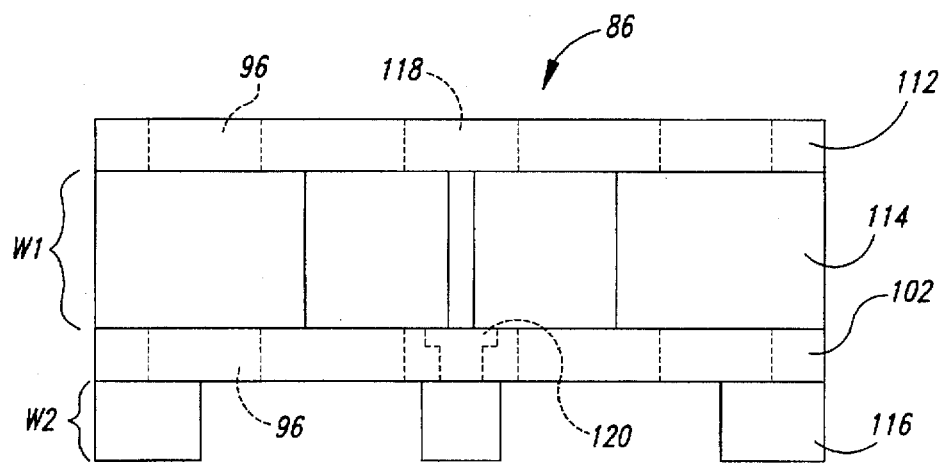
FIG. 5 is a cutaway side view of the spacer of FIG. 4.

FIG. 5 is a cutaway side view of spacer 86 of FIG. 4. Spacer 86 includes first and second plates 102 and 112. A first number of shims 114 are interposed between and coupled to plates 102 and 112 at approximately 120 degree intervals. Typically, the opposing sides of shims 114 are welded to the inner-facing surfaces of plates 102 and 112. However, any other suitable coupling means, such as bolting, may be used. A second number of shims 116 are coupled to an outer-facing surface of plate 102 at approximately 120 degree intervals, such that they are substantially aligned with shims 114. Shims 116 may be coupled to plate 102 in a manner similar to that described above for shims 114. Typically, plates 102 and 112 and shims 114 and 116 are made from steel, although any material of suitable strength may be used. Although three shims 114 and three shims 116 are shown aligned and spaced approximately 120 degrees apart, more or fewer shims may be spaced at equal or variable intervals in alignment or disalignment without departing from the spirit and scope of the invention. Furthermore, the widths W1 and W2 of shims 114 and 116, respectively, may vary according to the height of wall 94 (of hub 36) and regions 28 so that spacer 86 provides adequate clearance between disc 88 and mounting plate 84 (FIG. 4).

Still referring to FIG. 5, and as discussed in conjunction with FIG. 4, plates 102 and 112 include substantially aligned holes 96 for receiving cap screws (not shown) that attach disc 100 to hub 36. Plate 112 also includes a center hole 118 and plate 102 includes a countersunk center hole 120, which is substantially aligned with hole 118. A cap screw (not shown) may be inserted through hole 118 and engage hole 120 so as to fasten spacer 86 to shaft 18 (FIG. 4).

In one aspect of the invention, holes 96 have a diameter of approximately 1¹⁄₁₆", and hole 118 has a diameter of approximately 2". The wide or countersunk portion of hole 120 has a diameter of approximately 2", and the narrow or tapered portion has a diameter of approximately 1". Both plates 102 and 112 have a diameter of approximately 6¾" and a thickness of approximately ½". Shims 114 each have a width W1 of approximately 1½", a length of approximately 2", and a thickness of approximately ¼". Shims 116 each have a width W2 of approximately ¾", a length of approximately 1", and a thickness of approximately ¾".

Figure 6:
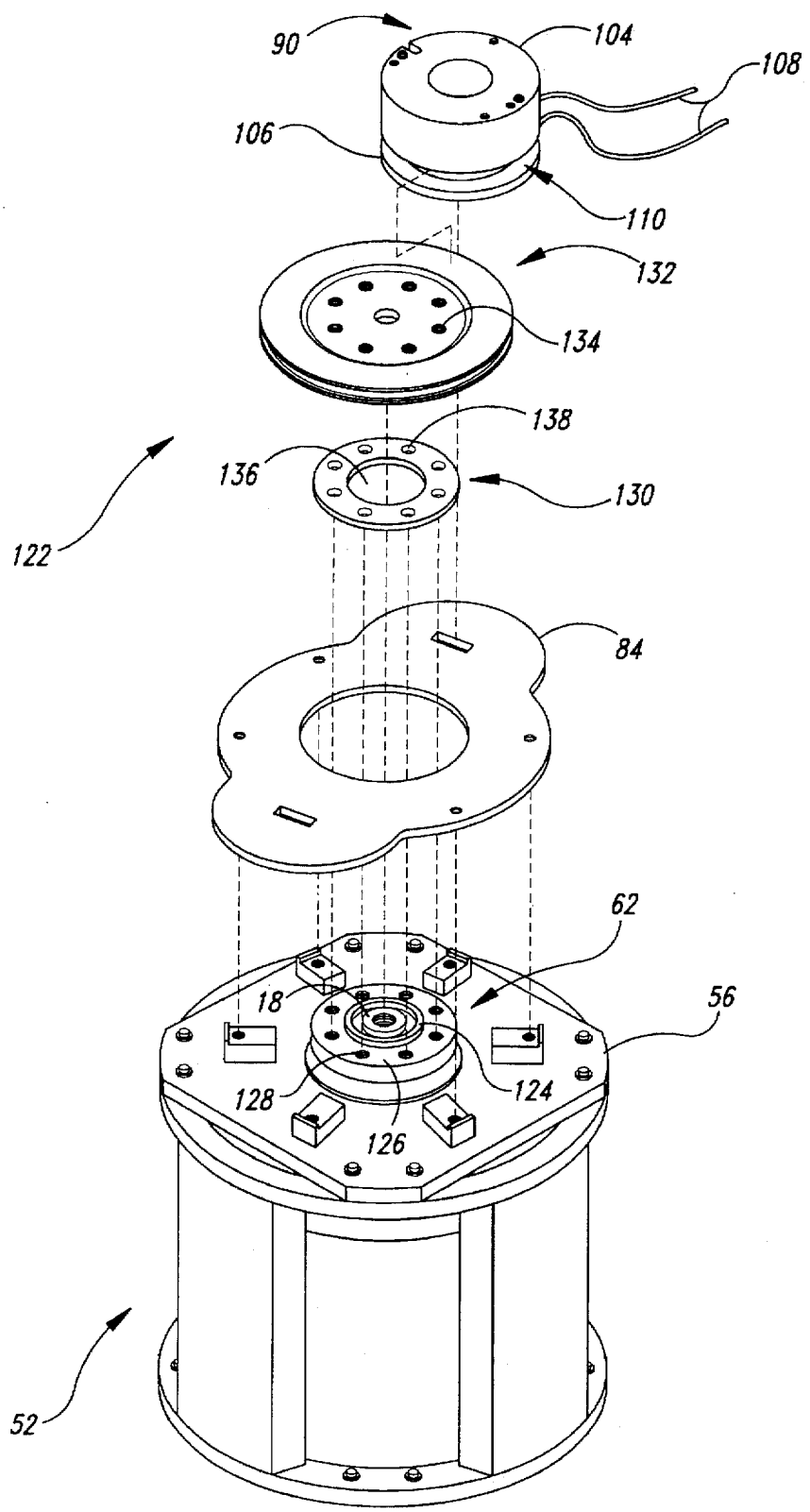
FIG. 6 is an exploded isometric view of another brake assembly according to the present invention.

FIG. 6 is an exploded isometric view of another embodiment 122 of a brake assembly according to the present invention. Because assembly 122 is suited to replace brake assembly 54 (FIG. 2), components of motor 52, including stator 14, endbell 56, and hub 62, are shown for clarity. However, brake 12 can be used with other motors without departing from the spirit and scope of the invention. As shown, hub 62 includes an inner flange 124 that extends beyond an outer flange 126 by a predetermined distance, i.e., height. Outer flange 126 includes threaded holes 128.

Brake assembly 122 includes mounting plate 84, which is described above in conjunction with FIG. 4, a spacer 130, a disc 132, and an electric caliper 90, which is further discussed below in conjunction with FIG. 7. Disc 132 is similar to disc 88 of FIG. 4, except that it includes holes 134, which can be aligned with holes 128 so that disc 132 can be coupled to hub 62. As discussed above for FIGS. 1, 2, and 4, certain items, such as screws, washers, and electrical connection terminals, are omitted from FIG. 6 for clarity.

Spacer 130 includes an inner opening 136 that is sized to receive, i.e., fit around, inner flange 124 of hub 62. Spacer 130 also includes spacer openings 138, which can be aligned with holes 128 and 134. When installed, spacer 130, which has a thickness approximately equal to the height of inner flange 124, has one side adjacent outer flange 126 and the opposite side adjacent disc 132, and provides adequate clearance between disc 132 and mounting plate 84.

In one aspect of the invention, spacer 130 is approximately ⅜" thick and has an outer diameter of approximately 6⅛" and an inner diameter of approximately 3½". Holes 138 each have a diameter of approximately 21/32". A spacer 130 having these dimensions is suitably sized to fit a hub 62 having an inner flange 124 with an outer diameter of approximately 3½", an outer flange with an outer diameter of approximately 6¼", and spacer holes 128 each with a diameter of approximately 21/32". Furthermore, the height of inner flange 124 is approximately 2⅜", and the thickness of outer flange 126 is approximately 1".

In all other structural and operational aspects, brake assembly 122 is similar to brake assembly 80 (FIG. 4). Furthermore, brake assembly 122 provides advantages similar to those provided by brake assembly 80.

Figure 7:
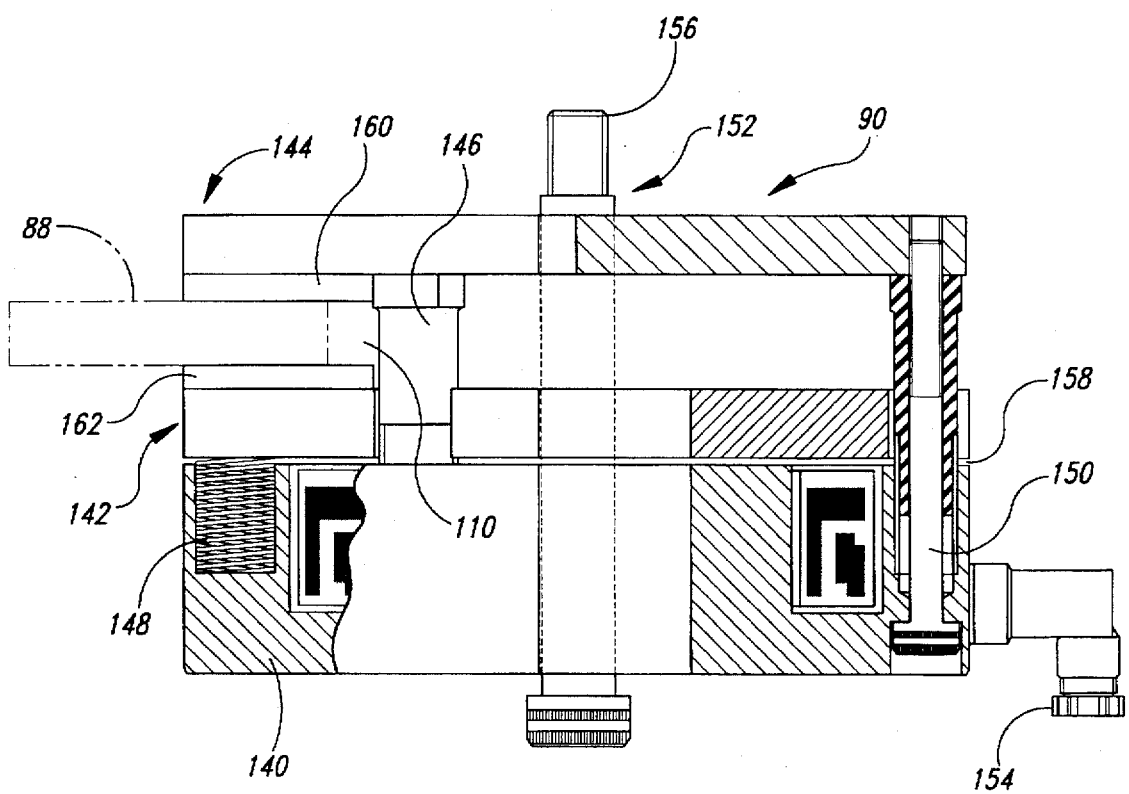
FIG. 7 is a side view with portions broken away of one embodiment of the electric brake caliper of FIGS. 4 and 6.

FIG. 7 is a side view with portions broken away of one embodiment of the electric caliper 90 of FIGS. 4 and 6. Caliper 90 includes a magnet and coil subassembly 140, an armature/friction-pad subassembly 142, including a friction pad or lining 162, an end-plate/friction-pad subassembly 144, including a friction pad or lining 164, an adjustable spacer 146, a compression spring 148, a socket-head cap screw 150, a shoulder screw 152 having a threaded end 156 for coupling caliper 90 to plate 84 (FIGS. 4 and 6), and an electrical connection terminal 154. In one aspect of the invention, caliper 90 is a 1CD "SURESTOP" RANGE Spring-applied, Electromagnetically-Released Caliper Brake manufactured by Matrix Engineering, Inc. The 1CD caliper comes in at least two sizes, and includes one each of magnetic and coil subassembly 140 and of subassemblies 142 and 144, three each of spacers 146 and cap screws 150, and two shoulder screws 152. The Matrix brake is described further in "Installation, Maintenance and Spare Parts Instructions, 1CD 'SURESTOP' RANGE Spring-applied, Electromagnetically-Released Caliper Brake," which is incorporated by reference.

In the position shown, caliper 90 is inactive or engaged, i.e., pads 162 and 164 are compressed against disc 88 (FIG. 4), shown in phantom. Spacer 146 is adjusted to maintain the desired width of air gap 158 when caliper 90 is in the engaged position. In the disengaged position, the width of air gap 158 becomes approximately zero.

In operation, when an approximately 24-volt, direct-current (24 VDC) electrical signal is applied to terminal 154, magnet and coil subassembly 140 generates a magnetic field, which retracts subassembly 142 so as to reduce the width of air gap 158 to approximately zero. Such action disengages subassemblies 142 and 144 from disc 88. When the signal is removed, springs 148 compress subassemblies 142 and 144 against disc 88 with a force sufficient to prevent it from rotating within space 110. Because magnet and coil subassembly 140 runs from a DC voltage, it does not require the laminations 45 of the existing brake assemblies 12 and 52 (FIGS. 1 and 2, respectively). Thus, caliper 90 often will last longer and require less frequent adjustments because it has no elements that compress and become disfigured to the extent that laminations 45 are often compressed and disfigured. Furthermore, friction pads 160 and 162 are easily replaceable when worn.

It will be appreciated that, although specific embodiments of the invention have been described herein for purposes of illustration, various modifications may be made without departing from the spirit and scope of the invention. For example, other types of electric calipers may be used for caliper 90, and different types of motors may incorporate a brake according to the present invention. Accordingly, the invention is not limited except as by the appended claims.

I claim:

1. A brake assembly for a motor that includes an endbell, a shaft having in axis of rotation and having an end portion that extends out of said endbell, and a hub located outside of said endbell, said hub attached to said end portion of said shaft, said brake assembly comprising:

a mounting plate fastened to said endbell;

a disc having an axis of rotation, said disc located outside of said endbell, said disc being attached to said hub such that said axis is substantially aligned with said axis of said shaft and said disc is axially spaced from said end portion of said shaft; and a first caliper fastened to said mounting plate and spaced from said axis of said shaft in a first radial direction, said first caliper operable to engage said disc absent an electromagnetic signal and to disengage said disc in response to said signal.

2. The brake assembly of claim 1, further comprising a second caliper fastened to said mounting plate and spaced from said axis of said shaft in a second radial direction, said second caliper operable to engage said disc absent said signal and to disengage said disc in response to said signal.

3. The brake assembly of claim 1 wherein said first caliper further comprises:

multiple pads;

a spring device operable to compress said pads against said disc absent said signal; and an electromagnetic device operable to retract said pads away from said disc in response to said signal.

4. The brake assembly of claim 1 wherein said disc and said mounting plate are formed from steel.

5. The brake assembly of claim 1, further comprising a spacer that is disposed between said hub and said disc.

6. A brake assembly for an electric motor that includes an endbell, a shaft having an axis of rotation and having an end that is located outward from said endbell, and a hub that is located outward from said endbell and that is fastened to said shaft end, said hub having an inner flange and an outer flange said inner flange extending beyond said outer flange by a predetermined distance, said outer flange having threaded holes, said assembly comprising:

a mounting plate fastened to said endbell;

a disc having disc openings corresponding to said threaded holes, said disc having an outer edge;

a spacer having an inner opening that is disposed around said inner flange, spacer openings corresponding to said threaded holes, and a thickness approximately equal to said predetermined distance, said spacer interposed between said hub and said disc such that said disc is displaced from said shaft end in an axial direction;

first bolts that extend through said spacer and disc openings and into said threaded holes to fasten said disc to said hub; and a first caliper fastened to said mounting plate in a first position that is outward of said shaft axis, said first caliper operable to grasp said disc along said outer edge of said disc absent an electrical signal and to release said disc in response to said signal.

7. The assembly of claim 6, further comprising a second caliper fastened to said mounting plate in a second position that is outward of said shaft axis, said second caliper operable to grasp said disc along said outer edge absent said signal and to release said disc in response to said signal.

8. The assembly of claim 6 wherein said first caliper further comprises:

a pair of pads;
one or more springs operable to compress said pads against opposite sides of said disc absent said signal; and
an electromagnetic device operable to retract said pads away from said sides in response to said signal.

9. The assembly or claim 6, further comprising second bolts that fasten said mounting plate to said endbell.

10. The assembly of claim 6, further comprising one or more bolts that fasten said first caliper to said mounting plate.

11. The assembly of claim 6 wherein said spacer is annular.

12. A brake assembly for an electric motor that includes an endbell, a shaft having an axis of rotation and having an end that is located outward from said endbell, and a hub that is located outward from said endbell and that is fastened to said shaft end, said hub including a plate and a wall that extends a predetermined distance beyond said plate to define a recess, said plate defining threaded holes, said assembly comprising:

a mounting plate coupled to said endbell;
a spacer having spacer openings corresponding to said threaded holes and having a thickness that is greater than or approximately equal to said predetermined distance, said spacer located within said recess, said spacer having an end that faces out from said recess;
a disc located adjacent to said spacer end and axially outward of said shaft end, said disc having disc openings corresponding to said threaded holes;
a first plurality of bolts extending through said spacer and disc openings and into said threaded holes to couple said disc to said hub; and
a first caliper coupled to said mounting plate and spaced radially outward from said shaft axis, said first caliper operable to clamp said disc absent an electrical signal and to release said disc in response to said signal.

13. The assembly of claim 12, further comprising a second caliper coupled to said mounting plate and spaced radially outward from said shaft axis, said second caliper operable to clamp said disc absent said signal and to release said disc in response to said signal.

14. The assembly of claim 12 wherein said first caliper further comprises:

a pair of opposing pads;
one or more springs operable to compress said pads against an outer portion of said disc absent said signal; and
an electromagnetic device operable to retract said pads away from said outer portion in response to said signal.

15. The assembly of claim 12, further comprising second bolts that couple said mounting plate to said endbell.

16. The assembly of claim 12, further comprising one or more bolts that couple said first caliper to said mounting plate.

17. The assembly of claim 12 wherein said spacer has a cylindrical space.

18. A motor, comprising:
an endbell;
a shaft having axis of rotation and an end that extends out of said endbell;
a hub positioned outside of the endbell and fastened to said shaft end;
a mounting plate positioned outside of said endbell and fastened to said endbell;
a disc having a center of rotation;
means for attaching said disc to said hub such that said center is substantially aligned with said shalt axis and said disc is positioned axially outward from said shaft end; and
a caliper fastened to said mounting plate and spaced from said shaft axis in a radial direction, said caliper operable to engage said disc absent an electromagnetic signal and to disengage said disc in response to said signal.

19. The motor of claim 18 wherein said:
disc comprises coupling holes;
said hub comprises threaded holes; and
said means comprises bolts that extend through said coupling holes and into said threaded holes.

20. An electric motor, comprising:
an endbell;
a shaft having an axis of rotation and an end that extends out from said endbell;
a hub positioned outside of said endbell and coupled to said shaft end, said hub including,
an outer flange having threaded holes, and
an inner flange that extends beyond said outer flange by a predetermined distance;
a mounting plate positioned outside of and coupled to said endbell;
a disc having multiple disc openings corresponding to said threaded holes;
a spacer having an inner opening that is positioned about said inner flange, spacer openings corresponding to said threaded holes, and a thickness approximately equal to said predetermined distance, said spacer positioned between said disc and said hub such that said disc is axially spaced said shaft end;
bolts that couple said disc to said hub, said bolts extending through said spacer and disc openings and into said threaded holes; and
a caliper coupled to said mounting plate in radially spaced relation to said shaft axis, said caliper operable to clamp said disc absent an electrical signal and to release said disc in response to said signal.

21. The motor of claim 20 wherein said caliper comprises:
a pair of pads;
one or more springs operable to compress said pads against an outer portion of said disc between said pads absent said signal; and
an electromagnetic device operable to release said outer portion in response to said signal.

22. An electric motor, comprising:
an endbell;
a shaft having an axis of rotation and an end that extends out of said endbell;
a hub located outside of said endbell and coupled to said shaft end, said hub including,
a plate having threaded holes; and
a wall coupled to and extending beyond said plate by a predetermined distance such that said plate and said wall define a recess;
a mounting plate located outside of and coupled to said endbell;
a spacer having spacer openings aligned with said threaded holes and a thickness that is greater than or approximately equal to said predetermined distance, said spacer located within said recess;

a disc located adjacent to said spacer such that said disc is spaced axially outward from said shaft end, said disc having disc openings that are aligned with said threaded holes;

bolts that couple said disc to said plate, said bolts extending through said spacer and disc openings and into said threaded holes; and a caliper coupled to said mounting plate and radially spaced from said shaft axis, said caliper operable to clamp said disc absent an electrical signal and to release said disc in response to said signal.

23. The motor of claim 22 wherein said caliper comprises:

a pair of pads;

one or more springs operable to compress said pads against opposite sides of an outer portion of said disc absent said signal; and an electromagnetic device operable to retract said pads away from said outer portion in response to said signal.

24. A transport device, comprising:

drive wheels;

a frame mounted on said drive wheels;

a lift mounted on said frame;

an electrical generator mounted on said frame; and a number of electric motors, each powered by said generator and operable to drive a respective one of said wheels and said lift in response to a respective signal, and to brake said respective one of said wheels and said lift absent said respective signal, each of said motors comprising, a housing, a shaft having an axis of rotation and having an end that extends out of said housing, a disc located outside of said housing;

means for coupling said disc to said shaft such that said disc is located axially outward from said shaft end; and a first caliper located outside of said housing, coupled to said housing, and radially spaced from said shaft axis in a first direction, said first caliper operable to engage said disc absent said respective signal and to disengage said disc in response to said respective signal.

25. The device of claim 24 wherein said means comprises a hub attached to both said shaft end and said disc.

26. The device of claim 25 wherein said means comprises a spacer interposed between said disc and said hub.

27. The device of claim 24 wherein one or more of said motors further comprises a second caliper located outside of said housing, coupled to said housing, and radially spaced from said shaft axis in a second direction, said second caliper operable to engage said disc absent said signal and to disengage said disc in response to said signal.

28. The assembly of claim 24 wherein said caliper comprises:

a pair of pads;

a spring device operable to compress said disc between said pads absent said signal; and an electromagnetic device operable to retract said pads and release said disc in response to said signal.

29. The device of claim 24 wherein said means comprises:

a hub coupled to said shaft end, said hub including, an outer flange defining threaded holes therethrough, and an inner flange that extends beyond said outer flange by a predetermined distance;

said disc including disc openings corresponding to said threaded holes;

a spacer interposed between said disc and said hub and having a thickness substantially equal to said predetermined distance, said spacer including, an inner opening that is located about said inner flange, and spacer openings corresponding to said threaded holes; and bolts extending through said spacer and disc openings and engaging said threaded holes to couple said disc to said hub.

30. The device of claim 29 wherein said outer flange and said spacer are annular and said inner flange is cylindrical.

31. The device of claim 24 wherein said means comprises:

a hub coupled to said shaft end, said hub including, a plate defining threaded holes therethrough, and a wall coupled to and extending beyond said plate by a predetermined distance such that said plate and said wall define a recess;

a spacer located within said recess and having a thickness that is greater than or approximately equal to said predetermined distance, said spacer including spacer openings corresponding to said threaded holes;

said disc adjacent to a side of said spacer extending from said recess, said disc having disc openings corresponding to said threaded holes; and bolts extending through said spacer and disc openings and engaging said threaded holes to couple said disc to said hub.

32. The device of claim 31 wherein said wall of said hub and said spacer are cylindrical in shape and said plate is circular in shape.

33. A brake assembly for a motor that includes a housing, a shaft that has an axis and an end that extends outside of said housing, and a hub that is located outside of said housing and that is coupled to said shall end, said brake assembly comprising:

a disc located outside of said housing and coupled to said hub, said disc having a center of rotation that is substantially aligned with said shaft axis;

a spacer located between said hub and said disc such that said disc is located axially outward from said shaft end; and a caliper located outside of and coupled to said housing, said caliper spaced radially from said shaft axis, said caliper operable to engage said disc absent an electromagnetic signal and to disengage said disc in response to said signal.

34. The brake assembly of claim 33, further comprising:

a mounting plate located outside of and coupled to said housing; and said caliper fastened to said mounting plate.

35. A motor, comprising:

a housing;

a shaft that has a shaft axis and a shaft end that is outside of said housing;

a hub that is located outside of said housing and that is coupled to said shaft end;

a disc located outside of said housing, and coupled to said hub, said disc having an axis of rotation that is substantially aligned with said shaft axis;

a spacer located between said disc and said hub such that said disc is spaced away from said shaft end in an axial direction; and a caliper coupled to said housing and disposed outward of said shaft axis in a radial direction, said caliper operable to engage said disc absent an electromagnetic signal and to disengage said disc in response to said signal.

36. The motor of claim 35, further comprising:

a mounting plate located outside of and coupled to said housing; and said caliper fastened to said mounting plate.

37. The device of claim 24 wherein at least one of said motors further comprises:

a mounting plate located outside of and coupled to said housing; and said first caliper fastened to said mounting plate.

* * * * *

UNITED STATES PATENT AND TRADEMARK OFFICE
CERTIFICATE OF CORRECTION

PATENT NO. : 5,679,993
DATED : October 21, 1997
INVENTOR(S) : David T. Oswald

It is certified that error appears in the above-indentified patent and that said Letters Patent is hereby corrected as shown below:

In column 8, claim 6, line 39, after the second instance of "flange" insert --, --.

In column 9, claim 9, line 7, after "assembly" delete "or" and substitute therefor -- of --.

In column 10, claim 18, line 3, after "said" delete "shalt" and substitute therefor-- shaft --.

In column 10, claim 22, line 58, after "holes" delete ";" and substitute therefor --, --.

In column 12, claim 33, line 38, after the first instance of "said" delete "shall" and substitute therefor -- shaft --.

Signed and Sealed this

Seventh Day of July, 1998

*Attest:*

BRUCE LEHMAN

*Attesting Officer*  *Commissioner of Patents and Trademarks*